United States Patent [19]
LaValley et al.

[11] Patent Number: 5,690,847
[45] Date of Patent: Nov. 25, 1997

[54] PIVOTAL TWEEZER HAVING GEARS AND SELF-REGULATING CURIE-POINT HEATERS

[75] Inventors: Ronald W. LaValley, Belmont; Michael Carlomagno, Redwood City; Jeffrey Philips, San Jose; Tark Abed, Palo Alto, all of Calif.

[73] Assignee: Metcal, Inc., Menlo Park, Calif.

[21] Appl. No.: 390,590

[22] Filed: Feb. 17, 1995

[51] Int. Cl.$^6$ ............................................. H05B 3/42
[52] U.S. Cl. ................................. 219/233; 294/99.2
[58] Field of Search .................... 219/227–229, 219/223, 237, 240, 477, 480; 606/28–31, 51–52; 30/140; 294/99.2; 43/132.1; D28/55

[56] References Cited

U.S. PATENT DOCUMENTS

| | | | |
|---|---|---|---|
| 3,752,017 | 8/1973 | Lloyd et al. | 81/9.44 |
| 4,171,701 | 10/1979 | Walter et al. | 606/133 |
| 4,553,021 | 11/1985 | Conti | 219/234 |
| 4,938,761 | 7/1990 | Ensslin | 606/51 |
| 5,169,398 | 12/1992 | Glaros | 606/52 |
| 5,176,690 | 1/1993 | Gross et al. | 606/133 |
| 5,226,908 | 7/1993 | Yoon | 606/28 |
| 5,351,580 | 10/1994 | Potesta et al. | 219/233 |
| 5,376,087 | 12/1994 | Haber et al. | 606/29 |

*Primary Examiner*—Teresa J. Walberg
*Assistant Examiner*—Raphael Valencia
*Attorney, Agent, or Firm*—Howard L. Rose

[57] ABSTRACT

A tweezer-like heater structure includes a pair of arms that can be pivoted towards one another and a pair of legs having ferromagnetic temperature self regulating Curie point heaters at the ends of the legs, the legs being removably connectable to electrical connectors located in the arms whereby current is supplied to coils that energize the heaters. Heaters of different temperatures are provided by choosing heaters with ferromagnetic materials having different Curie temperatures. The structure is used as a soldering iron by inserting a heater with a proper shape in one arm and short circuitry the connector in the other arm.

20 Claims, 5 Drawing Sheets

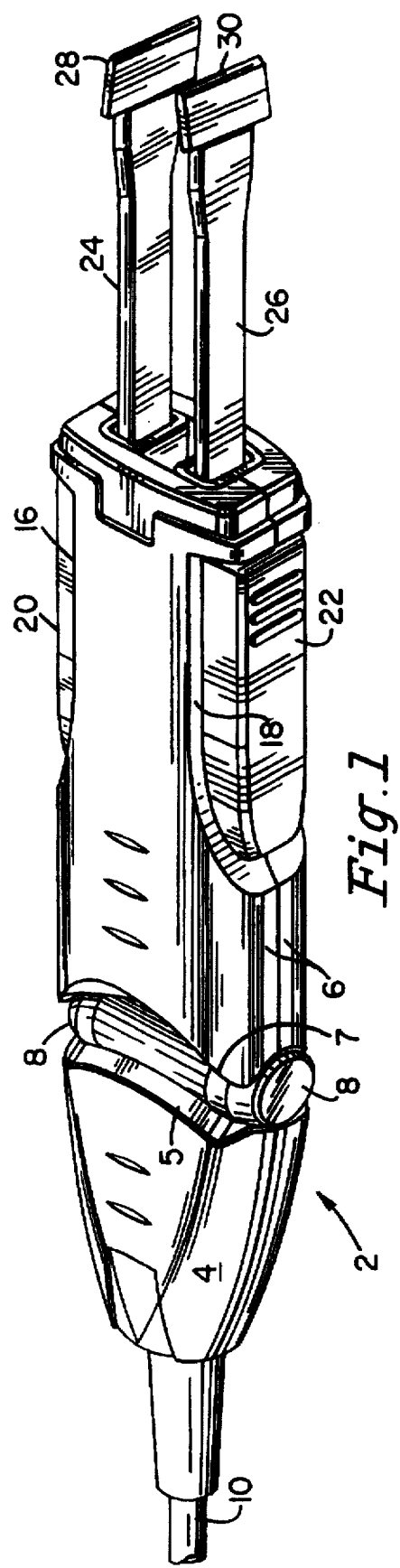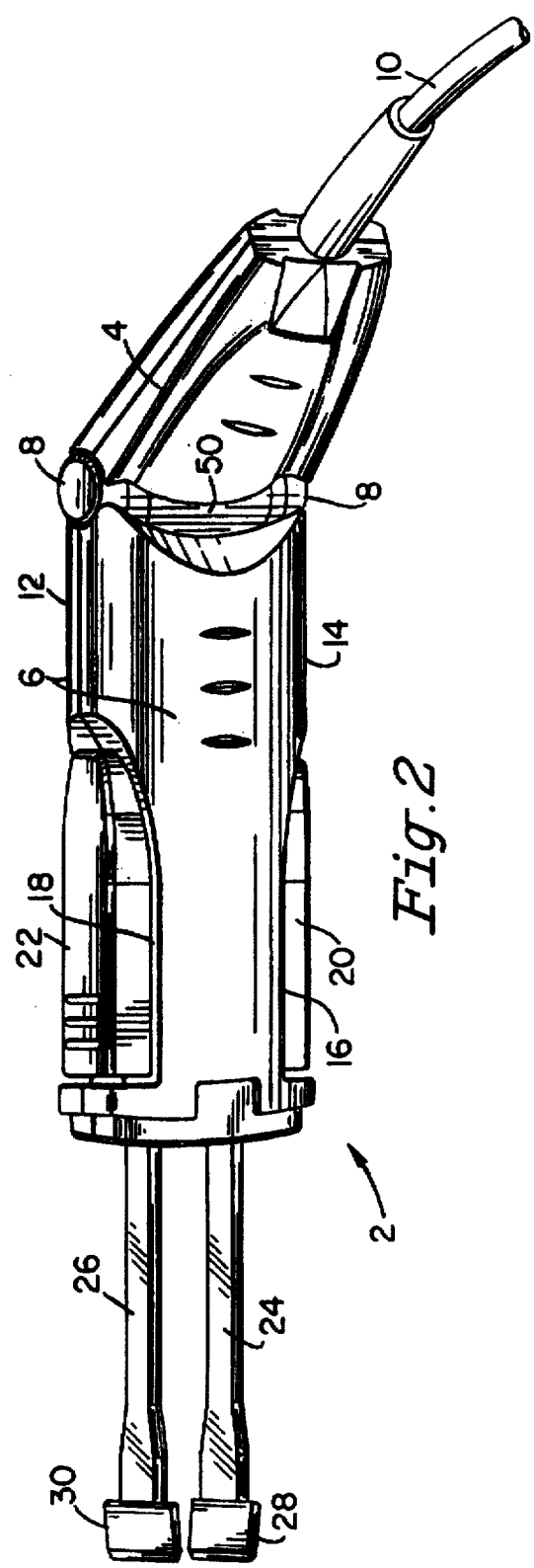

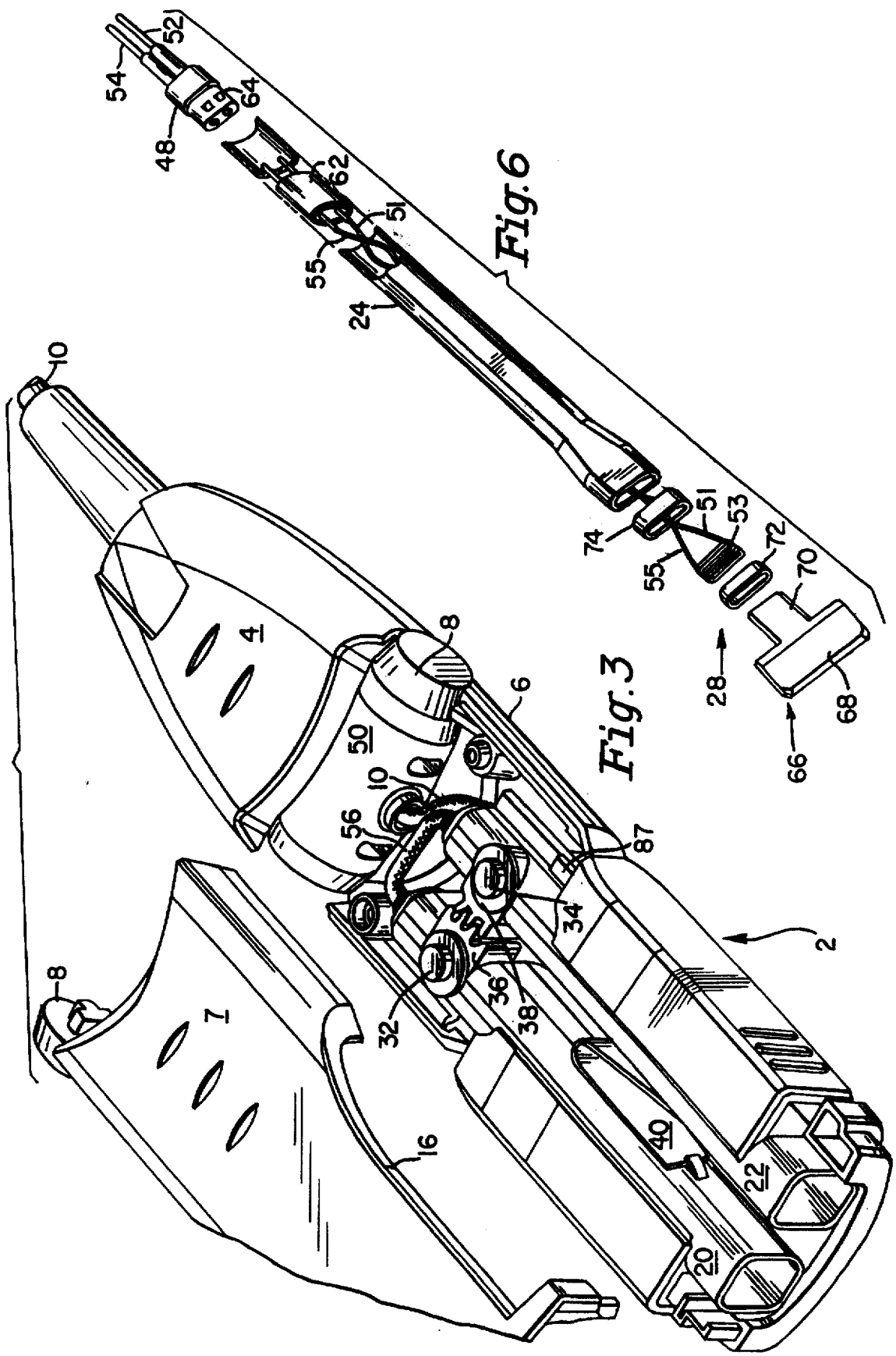

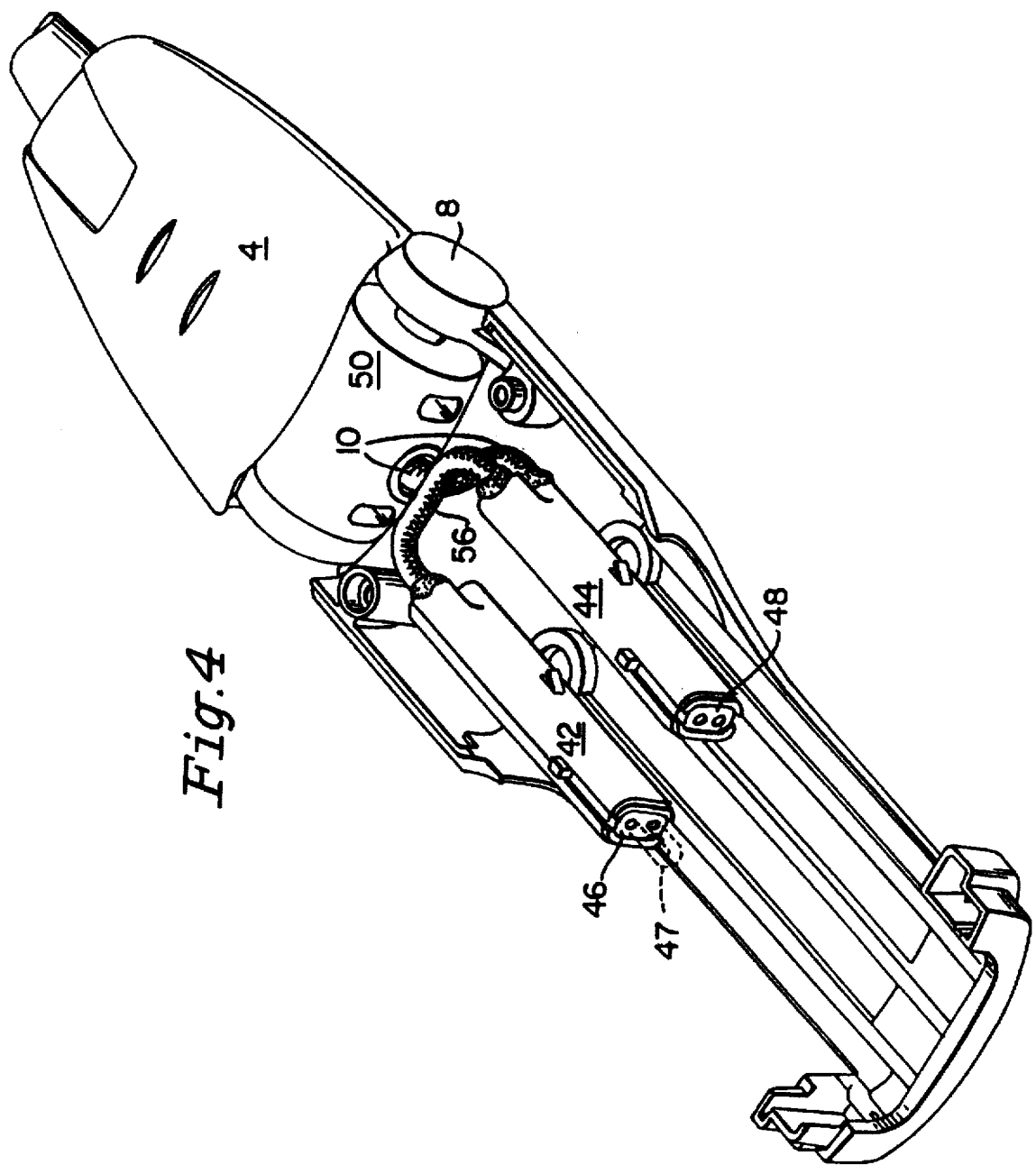

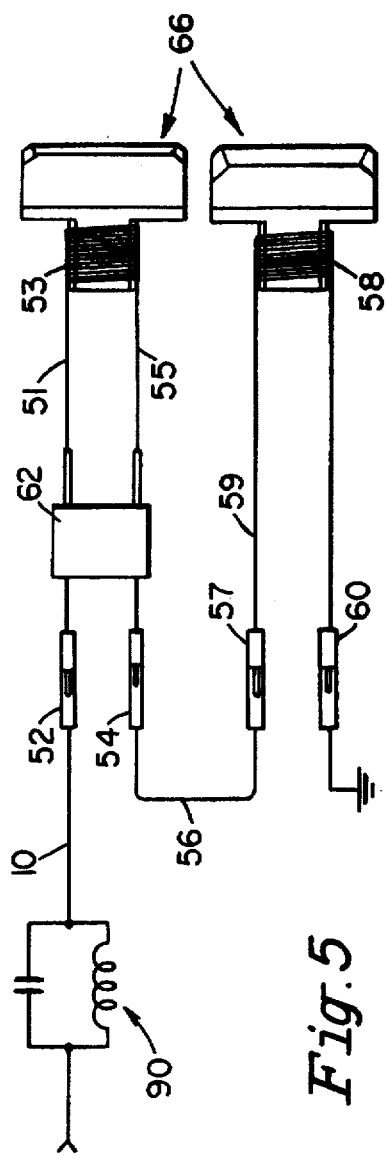
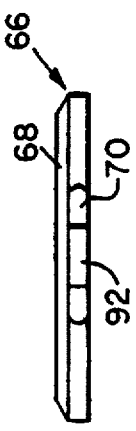
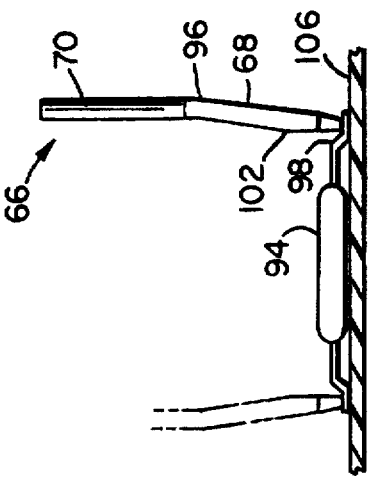
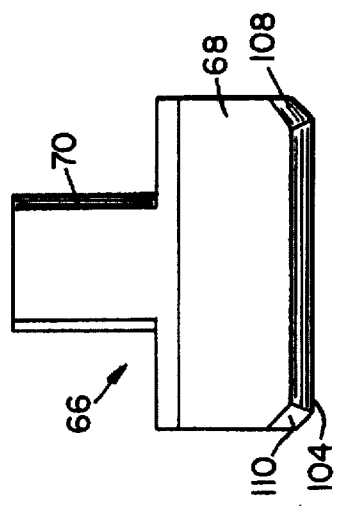
Fig. 5
Fig. 8
Fig. 9
Fig. 10

PIVOTAL TWEEZER HAVING GEARS AND SELF-REGULATING CURIE-POINT HEATERS

FIELD OF THE INVENTION

The present invention relates to temperature self-regulating, Curie point heaters and more particularly to temperature self-regulating, Curie point heaters in the general form of a tweezer in which each arm is associated with a different heater.

BACKGROUND OF THE INVENTION

There is a need today particularly as related to the circuit board repair industry for a quick and easy way to remove a defective component from a board. Such removal of a component requires heat to melt the solder holding the component and then lifting of the component while the solder is still molten. An additional consideration is the provision of a device that does not harm a component to be inserted by applying excessive heat. In some instances, because of load and/or other factors, different temperatures are desired to be applied to opposite sides of the component.

It is noted the present component removal tools are limited to such use while greater flexibility of uses may be desired.

OBJECTS OF THE INVENTION

It is an object of the present invention to provide a tweezer-like structure in which the ends of the arms of the tweezer are heated by a Curie point temperature controlled heater.

It is another object of the present invention to provide a tweezer-like structure having a Curie point heater at the ends of each of the tweezer arms which heaters may be connected in series and connected to a constant current source whereby the Curie points of the two heaters may be different.

It is yet another object of the present invention to provide a tweezer-like structure having heaters at the ends of the two arms, which arms are removable whereby various different configurations of arms and heaters of a variety of temperatures may be employed to accomplish different tasks.

Still another object of the present invention is to provide tweezer-like structures having a Curie point temperature controlled heater at the end of each arm, the heater being shaped to be operative with a specific load.

It is another object of the present invention to provide a tweezer-like structure that may be used as a component remover or a soldering iron.

BRIEF DESCRIPTION OF THE PRESENT INVENTION

The present invention provides a main body into which are insertable elongated members forming the arms of a tweezer-like structure. By squeezing the arms on opposite sides of the body, the arms are moved toward one another so that members may be brought together or grasp an object between them. The arms have heaters at the end of each so that the object grasped may be heated on both sides.

The heaters are temperature self-regulating heaters generally of the type disclosed in U.S. Pat. No. 4,256,945 ('945), the disclosure relating to operation of the heater in such patent being incorporated herein by reference. In such heaters a very high frequency constant current is passed through a body of highly conductive material, such as copper clad with a ferromagnetic material of relatively high resistivity. As a result of skin effect, current is concentrated in a relatively narrow band at the surface of the heater, that is, the current is concentrated in the ferromagnetic material and rapid heating occurs. As the temperature approaches Curie temperature the permeability of the ferromagnetic material falls (approaches a paramagnetic state) and the current spreads into the copper. The power supply employed to excite the heater(s) is a constant current source so that P=KR where P is power, K is current squared and R is resistance. It is apparent that as resistance falls and current remains the same, the heating effect is reduced, the temperature falls below the effective Curie temperature and heating resumes so that the cycle repeats.

In accordance with one aspect of the invention the heater is heated by an alternating magnetic field produced by a coil wrapped around a section of the heater where the ferromagnetic material is applied. Thus eddy currents and hysteresis produce heating, both being materially reduced upon the ferromagnetic material becoming essentially paramagnetic.

An important feature of the invention is that by connecting the two heaters in series, the standard 13.56 Mhz constant current power supply of Applicant's assignee, can be and is used to energize the device. It must be pointed out, however, that the heaters can be connected independently for specific purposes or only one arm and heater may be employed if it is desired to use the tool as a soldering iron, wood searing tool, glue activator or the like.

The heaters at the ends of the tweezer-like arms are clad with ferromagnetic material of the desired Curie temperature which may be different for different heaters. The heaters are in the general form of a broad thin "T" with a coil wrapped about the leg of the "T". The cross member of the "T" is angled at a given angle and the end surface is tapered at an angle such that in spite of the angle of the "T" the ends lie flat against the circuit board when the legs are pressed against the side of the pins of a component. The angle of the "T" is such that the pins can be contacted even if inset from the edge of the body of the component.

The above and other features, objects and advantages of the present invention, together with the best means contemplated by the inventor thereof for carrying out the invention will become more apparent from reading the following description of a preferred embodiment and perusing the associated drawings in which:

BRIEF DESCRIPTION OF THE DRAWINGS

FIG. 1 is a side view in perspective of the external structure of the device of the present invention;

FIG. 2 is a top partial view of the structure;

FIG. 3 is a top perspective view of the structure with the top removed;

FIG. 4 is a top perspective view with the top and arms removed;

FIG. 5 is a diagram illustrating diagrammatically of the circuitry of the structure;

FIG. 6 is an exploded view of the elements of a heater leg of the invention;

FIG. 8 is an enlarged view of a heater to be positioned at the end of a leg of the structure;

FIG. 9 is a side view of the heater as applied to a component; and

FIG. 10 is a top view of the heater.

DETAILED DESCRIPTION OF THE PRESENT INVENTION

Figure 7:
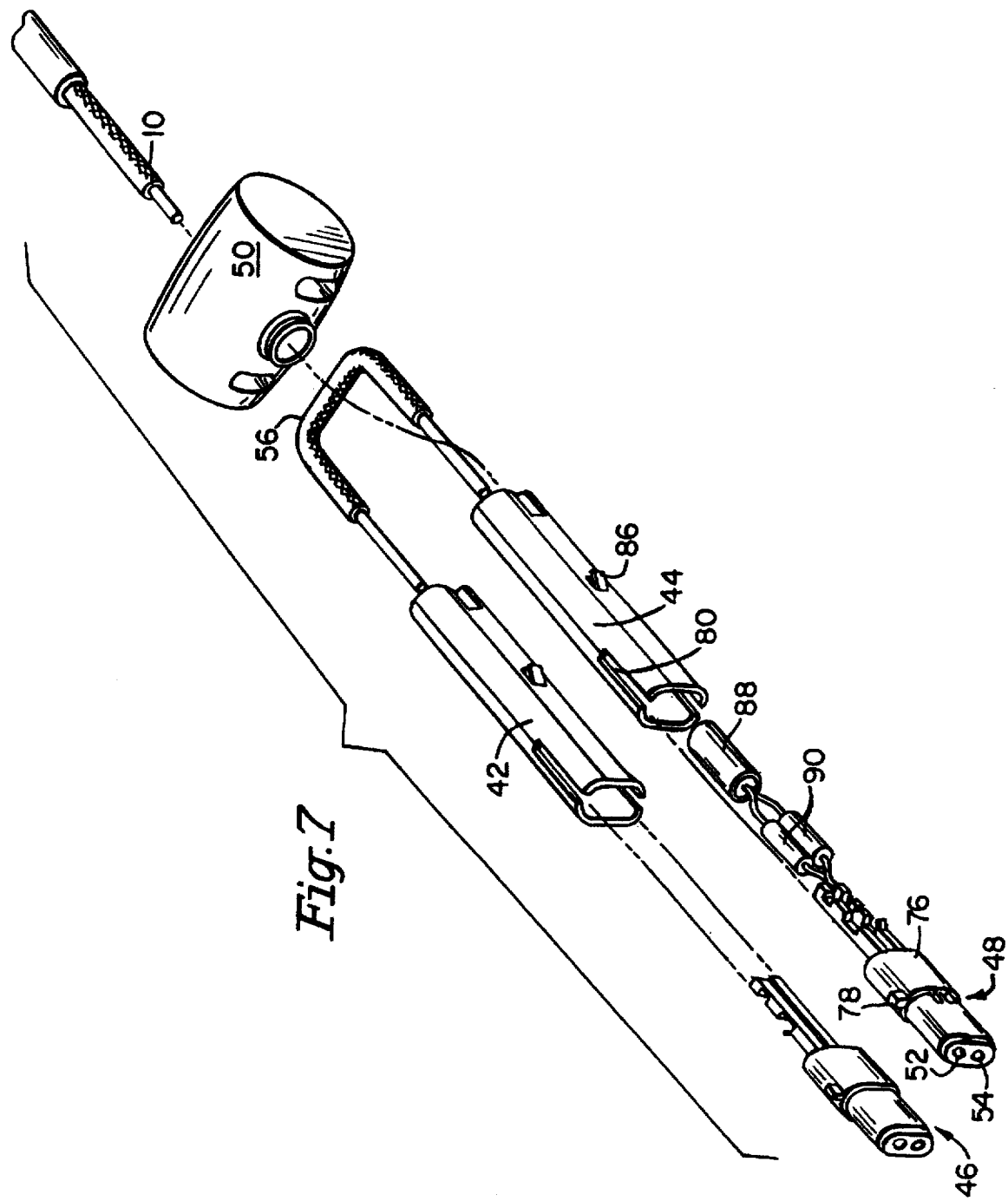
FIG. 7 is an exploded view illustrating the interior elements in a sleeve having the electrical connectors for the heaters in the legs.

Referring specifically to FIGS. 1 and 2 of the accompanying drawings external views of the device of the present invention are illustrated.

The device, hereinafter the "heater tweezer", generally designated by the reference numeral 2, has two main body members 4 and 6, the body 6 having a cover 7.

The members 4 and 6 are pivoted to one another by a pivot structure 8, the body member 4 receiving a power cord 10 and delivering it to the body member 6 through a hole 9 (illustrated in FIG. 7) in the pivot 8. The pivoting of member 4 relative to member 6 is to permit the user to orient the member 6 in various positions relative to the power cord.

The member 6 is a relatively flat body with sides 12 and 14 recessed at locations 16 and 18 to expose arms 20 and 22 as will become apparent, arms 20 and 22 being exposed so that they can be squeezed toward one another. Legs 24 and 26 are insertable into arms 20 and 22, respectively, and carry heaters 28 and 30, respectively, at their ends.

Referring now specifically to FIG. 3 of the accompanying drawings, the heated tweezer is illustrated with the upper half of the body removed. The arms 20 and 22 are pivoted, respectively, about pivots 32 and 34 with gear segments 36 and 38 extending from the arms 20 and 22 and into contact with one another adjacent the pivots 32 and 34. Thus movement of one of the arms 20 or 22 produces like movement of the other arm. The arms 20 and 22 have a V-shaped spring 40 disposed between them to bias the arms away from one another. Thus when the arms 20 and 22 have been squeezed so that their ends remote from the pivots 32 and 34 are moved toward one another, the spring returns them to their quiescent position upon release.

Referring now to FIGS. 4, 5 and 6, the body 6 is illustrated with the arms 20 and 22 removed exposing the structure for connecting the heaters to the cable 10. Located within the arms 20 and 22 (see FIGS. 4 and 7) are sleeves 42 and 44 in which are located female connectors 46 and 48, respectively. Cable 10 enters the body 6 through a drum like member 50 that is retained by overlapping regions 5 and 7 of bodies 4 and 6, respectively (see FIG. 1). The cable 10 enters sleeve 44, is connected to capacitor/inductor 90, then connected to one terminal 52 of female connector 48 (see FIGS. 5 and 6), proceeds via lead 51 to coil 53 of heater 28, as described in more detail subsequently, returns via lead 55 to terminal 54, crosses over via cable 56 to sleeve 42, connects via a first terminal 57 of connector 46, via a lead 59 to coil 58 and is connected to ground at a second terminal 60 of connector 46.

As can be seen in FIG. 5 the two coils 53 and 58 are connected in series across a constant current power supply (not illustrated) to which cable 10 is connected. Thus the Curie point temperature control is achieved.

Referring specifically to FIG. 6 of the accompanying drawings, the heaters are carried on the end of legs 24 and 26, only one of them, leg 24, being illustrated in FIG. 6. The leg carries a male connector 62 having male contacts that mate with the contacts of the female connector 48. As seen, the male connector 62 is secured in leg 24, recessed so that the male terminals of connector 62 may be seated in the terminals of connector 48 when leg 24 is slid over region 64 of connector 48. The contacts of male connector 62 are connected, as previously indicated, via leads 51 and 55 to heater coil 53.

The heater 28 in one form comprises a generally T-shaped member 66 having a cross member 68 and a leg 70. The member 66 is covered with or is made of ferromagnetic material having a desired Curie temperature. An oval collar 72 of ferromagnetic or nonferromagnetic material of low thermal conductivity is preferably brazed to the leg 70, then the coil 72 is placed about the leg and a further oval shaped member 74 of high permeability ferromagnetic material to act as a magnetic shield may be but not necessarily placed over the coil. The oval shaped member is quite thin and is split to render it flexible. The elements including leg 70, collar 72, coil 53 and collar 74 are wedged into the end of leg 24 so that only the cross members 68 protrude from the legs.

The arrangement of the female connectors 48 in the sleeves 42 and 44 is illustrated in FIG. 7. Only the arrangement relative to sleeve 44 is described. A rear part 76 of the connector 48 is enlarged so as to be of the same size and configuration as the interior of the sleeve 44. The rear part has an upstanding stud 78 that upon insertion of the connector 48 into the sleeve, the stud 78 slides into a slot 80 ensuring proper alignment of the connector relative to the male connector 62 in leg 24. The connectors 46 and 48 are force fitted into sleeves 42 and 44, respectively. The sleeves 42 and 44 have tabs 86 that snap into recesses 87 (only the one in arm 22 being illustrated—see FIG. 3) to maintain the sleeves in the arms.

It is noted that the sleeve 44 carries an impedance matching circuit; in the illustrated embodiment comprising impedance matching capacitors 90. An insulating sleeve 88 is placed over the capacitors to prevent a short circuit. The specific values of the capacitors may vary with the heater employed and in one instance with a heater coil impedance of 110 at a 70° phase angle may have the following value of capacitance 150 picofarads.

Referring to FIGS. 4 and 5, the legs 24 and 26 and associated heaters, connectors, etc. can be readily inserted into and removed from the tool. Upon full insertion into the tool, the male and female connectors mate and upon energization of the device the heaters are activated and soldering or desoldering or other heat associated operation can take place. The heaters are readily replaced by simply withdrawing a leg and inserting another leg having a heater of a different Curie temperature and/or configuration. Also it is possible to use the present apparatus as a soldering iron by providing only one leg with a heater at the end and a short circuited leg to complete the circuit. The circuitry in the leg with the heater must provide the required impedance matching. The short circuit can be applied by a U-shaped member 47, shown in dashed lines in FIG. 4, inserted into connector 46. Also a short leg, for leg 26, for instance, can be used that terminates at the end of arm 20 and is short circuited. In such case turns of the coil of the remaining leg are increased to double the impedance of the coil to compensate for the loss of impedance in the other leg.

Referring to FIGS. 8, 9 and 10 of the accompanying drawings, the various aspects of the T-shaped heater 66 are illustrated. As can be seen in FIG. 10 the sides of the leg 70 are rounded to accept the elements 53, 72 and 74.

The cross member 68 is configured to provide maximum heat to the pins of a component to be soldered or unsoldered. Specifically the cross member 68 is angled in at 96, to the left in FIG. 9, to come in contact with a pin 98 (only one illustrated). Region 100 of the cross member 66 below the angled-in region is angled at 102 to be essentially vertical with end 104 essentially horizontal to lie flat against a pin 98.

It is to be noted that corners 108 and 110 of the member 68 are chamfered at 106 and 108. The fronts and backs of the members 68 are also chamfered. The edge chamfers are to permit the tool to contact small areas rather than the extensive areas contacted by the main surface of the blade. A pointed heater is employed when the tool is used to solder a single joint.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A tweezer heater structure comprising
   a main body,
   a pair of hollow arms having a generally elongated body and two ends,
   means for pivotally securing said arms in said main body for rotation of one end of each of said arms about a different pivot,
   means to cause the other ends of said arms to move toward and away from one another,
   at least one end of each end said arm being open ended,
   a heater for the ends of the arms,
   an electrical connector having at least two contacts located in at least one of said arms facing the open end of said arm,
   said electrical connector connected to the heater to supply electrical energy thereto.

2. A tweezer heater structure according to claim 1 wherein said means to cause comprises
   a gear on each said arms adjacent said means for pivotally securing said arms,
   said gears meshing with one another whereby pivotal movement of one arm are about to pivot produces pivotal movement of the other arm.

3. A tweezer heater structure according to claim 2 further comprising
   spring means for biasing said open ends of said arms away from one another.

4. A tweezer heater structure according to claim 1 wherein said body comprises two members,
   a pivot for pivotally securing said bodies to one another about an axis perpendicular to the elongated dimension of said arms.

5. A tweezer heater structure according to claim 4 further comprising
   an electrical cable,
   said cable entering one of said bodies and extending into the other of said bodies through the region of said pivots,
   said arms being located in the other of said bodies.

6. A tweezer heater structure according to claim 1 further comprising
   a pair of sleeves each disposed in a different one of said arms; and
   a second electrical connector having two contacts located in the other of said arms,
   said electrical connectors located in said sleeves in said arms.

7. A tweezer heater structure according to claim 6 further comprising
   said cable having a conductor connected to one of said contacts of said connector in said one of said sleeves,
   an electrical connection between the other of said contacts of said connector in a first of said sleeves to a contact of the connector in a second of said sleeves,
   the other contact of the connector in the other of said sleeves being connected to a reference potential.

8. A tweezer heater structure according to claim 1 further comprising
   a leg having two ends,
   a further electrical connector secured to said leg adjacent one end,
   said further electrical connector being mateable with said electrical connector in one of said sleeves,
   an electrically actuatable instrument,
   said electrically actuatable instrument secured in the other end of said leg,
   and means for conveying electrical energy from said further electrical connector to said electrically actuatable instrument whereby to complete the circuit between the two contacts of said electrical connector in said one of said sleeves.

9. A tweezer heater structure according to claim 8 further comprising
   means for completing the circuit between the two contacts of the other of said sleeves.

10. A tweezer heater structure according to claim 9 wherein
    said means for completing the circuit is a short circuit.

11. A tweezer heater structure according to claim 9 wherein said means for completing the circuit comprises
    a second leg having two open ends,
    a still further connector located adjacent one end of said leg,
    said still further connector being mateable with said connector in the other of said sleeves.

12. A tweezer heater structure according to claim 11 further comprising
    a second electrically actuatable instrument located in the other end of said second leg, and
    means connecting said still further connector to said second electrically actuatable instrument.

13. A tweezer heater structure according to claim 8 wherein
    said electrically actuatable instrument is a heater.

14. A tweezer heater structure according to claim 8 wherein
    said electrically actuatable instrument is a temperature self regulating Curie point heater.

15. A tweezer heater structure according to claim 14 wherein said heater comprises,
    a body including ferromagnetic material,
    a coil for energizing said ferromagnetic material to heat the ferromagnetic material to a temperature approaching its Curie temperature whereby to render said material essentially paramagnetic.

16. A tweezer heater structure according to claim 15 wherein said heater further comprises
    a blade-like member having an elongated region,
    said region angled inwardly and terminating in a region of a reverse angle.

17. A tweezer heater structure according to claim 16 wherein said blade has chamfered edges providing flat surfaces materially shorter than said elongated region.

18. A tweezer heater structure according to claim 15 wherein said heater is pointed.

19. A tweezer heater structure according to claim 15 further comprising means for impedance matching a source of electrical energy to said heater structure.

20. A tweezer heater structure comprising a main body, a pair of hollow arms having a generally elongated body and two ends, means for pivotally securing said arms in said main body for rotation about one end of each of said arms, means to cause the other ends of said arms to move toward and away from one another, at least one end of each said arm being open ended, a pair of sleeves each disposed in a different one of said arms, different electrical connectors seated in each of said sleeves each facing the open end of its associated arms, a different Curie point heater each having an electrical adapter mateable with a different one of said electrical connectors, a different gear adjacent an end of each of said arms adjacent said means for pivotally securing said arms, said gears meshing with one another whereby pivotal movement of one arm towards the other arm provides pivotal movement of the other arm towards said one arm.

* * * * *